June 30, 1970 J. RING 3,518,428

MAGNETICALLY ATTRACTIVE IDENTIFYING PLATES
FOR ATTACHMENT TO X-RAY CASSETTES

Filed May 15, 1968 2 Sheets-Sheet 1

10

INVENTOR.
JACK RING

By
OSTROLENK, FABER, GERB & SOFFEN
ATTORNEYS

INVENTOR.
JACK RING
BY
OSTROLENK, FABER, GERB & SOFFEN
ATTORNEYS 3,518,428

MAGNETICALLY ATTRACTIVE IDENTIFYING PLATES FOR ATTACHMENT TO X-RAY CASSETTES

Jack Ring, 224 Louise Drive, Morrisville, Pa. 19067
Continuation-in-part of application Ser. No. 712,786, Mar. 13, 1968. This application May 15, 1968, Ser. No. 729,144
Int. Cl. G03b 17/24, 41/16
U.S. Cl. 250—67 10 Claims

ABSTRACT OF THE DISCLOSURE

A nameplate assembly for use with X-ray cassettes, and the like, for providing positive indication on exposed negatives and to provide a positive identification for the user as to the word which will be formed upon an X-ray plate (i.e., exposed negative) and further comprised of magnetic means for simple straightforward mounting upon a mounting board to greatly facilitate removal and replacement of such identifying plates in making X-rays.

This application is a continuation-in-part of application Ser. No. 712,786 filed Mar. 13, 1968, now abandoned.

The present invention relates to X-ray techniques, and more particularly to novel nameplates for use with X-ray cassettes, and the like, comprising identifying means for rapidly identifying each identifying plate; means for forming identifying words upon X-ray negatives as a result of exposure and magnetic means usable in cooperation with a mounting board for facilitating removal and replacement of such identifying plates.

X-ray technicians in the production of X-rays normally employ a plurality of identifying plates which are positioned upon X-ray cassettes during the exposure to radiation of the subject in order to provide positive means on each exposed negative identifying the subject matter. For example, in a case where the left hand of a subject is to be X-rayed, it is desirable to provide an identifying plate which may be positioned upon the X-ray cassette during exposure operation to identify that hand which is being X-rayed. Present techniques usually employ a flat metallic plate upon which solid lead letters are secured usually by a suitable adhesive or glue, said letters being arranged in a combination to form a word (which may be in abbreviated fashion, for example) or words to identify that portion of the body (or other subject) being X-rayed. Identification of the particular plate is immediately ascertained by reading the word which the solid lead letters form. Since X-ray technicians constantly use such identifying plates, it is typical to provide a mountnig board which is conviently located within an X-ray room upon which each identifying tag is found. One exemplary board may be comprised of a plurality of hooks upon which one or more of the identifying tags may be mounted, each tag being provided with an aperture near one end thereof so as to be suspended from a hook and relatively easily readable to enable the X-ray technician to immediately identify that tag which he desires to employ, to remove the tag from the board employed during an exposure operation and to return the tag to the board.

Such hooks are somewhat awkward to use requiring technicians to be careful in removing and/or replacing the tags in an effort not to damage either the hook or the tag. Through continued use, it has been found that the tag will become bent or broken near the opening providing no suitable means for suspending the tag from one of the hooks provided on the mounting board.

In addition, such mounting sheets are normally formed of a thin, relatively flexible metal such as, for example, aluminum on which the rigid lead letters are adhered. Due to the dissimilarity of the metals, and the fact that the lead is a rigid material, the bending of the metal sheets usually causes the lead letters to break off and often times become lost, resulting in an identifying tag which is not very serviceable over long periods of time.

The problems of such conventional tags are not simply remedied by making the tag portion thicker to prevent its bending, since the thickness of the sheet and the thickness of the lead letters may prevent its use in a "Bucky" utilized in a wide variety of X-ray equipment wherein an insufficient amount of clearance would be provided in such holders, causing the identifying tags to be moved away from the X-ray cassette in positioning it in the holder.

In addition thereto, such lead letters are expensive, and are not easily mounted upon such sheets making such tag assemblies rather expensive. The natural color of such sheets and the lead letters mounted thereon is usually quite similar, making it somewhat difficult to distinguish the word which the lead letters form upon the identifying tag when making a selection from a board containing the tags. Also, due care must be utilized in handling such identifying tags since dissimlarity of the materials and the fact that the lead letters are normally only glued to the thin metal sheet results in a high breakage rate when such units are dropped. In addition thereto, the apparatus provided in each tag are provided at one end thereof, causing the tags to hang vertically and thereby making the tags more difficult to read while mounted on their hooks.

The present invention overcomes all of the above disadvantages and is characterized by providing an identifying tag which is extremely light in weight, which provides excellent contrast for reading the word of the identifying tag and which is easily removable and repleaceable upon a simple mounting board requiring no hooks whatsoever to thereby greatly facilitate the activities of a technician in an X-ray room, thereby releasing his energies for the more important and less menial activities surrounding the production of an X-ray.

The device of the present invention is comprised of a relatively thin flexible sheet of a plastic material which originally is formed by homogeneously admixing the plastic material with fine particles of a magnetic material so as to have the magnetic material particles uniformly distributed throughout the plastic sheet. The sheet is magnetized either prior to or subsequent to formation, whichever is more suitable, in order to enable it to easily and forcefully cling to a mounting board.

The particular word which is to be formed upon an X-ray negative is cut into one surface of the thin magnetized plastic sheet by a cutting, etching, or other forming operation wherein the word takes the form of depressions formed in one surface of the magnetized plastic material.

The depressions are then filled by a fine lead powder which is initially admixed with a suitable fluid (i.e., water) to form a pasty substance. The pasty substance is firmly pressed into the depressions formed in one surface of the magnetic plastic material so that each depression, which is preferably of a uniform thickness or depth, contains a substantially uniform amount of the pasty lead substance.

The surface of the magnetic plastic sheet containing the depressions and the pasty substance is then completely covered by a flat substantially continuous sheet of relatively resilient material so as to completely cover and seal the powdered lead material uniformly deposited within the depressions. The cover sheet may either be heat sealed or secured to the depression-bearing sheet by a suitable adhesive. Since the major portion of the contact surfaces are substantially flat, an excellent seal is provided, preventing any of the lead material from being dislodged from within the depressions.

The cover sheet may, for example, be a thin metallic material into which the identical word formed in the magnetic plastic sheet is cut or otherwise etched into the exposed surface of the covering sheet.

As an alternative embodiment, the covering sheet may be comprised of two thin laminated sheets of plastic of contrasting colors. The exposed sheet is machined, or otherwise cut, so as to expose at least the top surface of the undersheet, thereby forming the identical word formed by the depressions in the magnetic-plastic sheet to provide excellent background contrast for the formed word, enabling it to be simply and easily read even from a substantial distance.

A plurality of such identifying tags may be mounted upon a single mounting board formed of a thin metallic material having magnetic properties, i.e., capable of being attracted by magnetized articles. Each of the identifying tags are simply placed upon the surface of the mounting board, which, in turn, may be mounted upon a vertical wall. The magnetic strength of the magnetic plastic material is sufficient to cause each tag to remain on the mounting board indefinitely without either slipping or falling from its original position. Thus, replacement of each tag upon the board is quite simple and straightforward. Removal of the desired tag from the board is equally as simple and straightforward as replacement, since the magnetic strength required to retain a tag upon the mounting board certainly is not so great as to require any undue lifting force to remove the tag from the mounting board.

Since the individual tags are magnetized, there is no need for providing an opening in any of the tags for mounting upon hooks. Thus, the tag experiences no wear or tear in the conventional sense around such an aperture, as such apertures have been totally eliminated. No extreme care need be exercised in the handling of such identifying tags, since they are made of a highly durable plastic material which can bend an appreciable amount before being damaged. Since the fine lead power is permanently sealed within the depressions provided in the magnetic plastic sheet, there is no danger of breakage or detachment of the lead letters from identifying tag's proper. Also, the tags may be horizontally mounted upon the display board, making it much easier to read each tag.

After the selection of an identifying tag, the tag is placed upon an X-ray cassette to provide the proper identification of the body portion to be X-rayed. Conventional cassettes do not provide any sufficient means for adhering an identifying tag to the face thereof so as to overlie the X-ray negative. The conventional technique is to employ a strip of adhesive to adhere the identifying tag to the cassette thereby requiring an additional manual step to facilitate use of the tag. In order to adapt conventional cassettes to be compatible with the identifying tag described herein, a thin band of magnetically attractive metal (having a width of the order of ½ inch) is provided around the margin of the cassette immediately adjacent the outer frame of the cassette. This enables the identifying tag to be adhered to the metal band which is magnetically attractive allowing the identifying tag to remain in place during the X-ray operation.

As an alternative embodiment the identifying tag may be provided with a strip of non-magnetic plastic material across its rear face, which strip has a width substantially less than the width of the resilient magnetic material and a thickness which is substantially of the order of the thickness of the conventional cassette frame, thereby allowing the exposed resilient magnetic member to be magnetically attracted to the cassette frame which holds the identifying tag in position during the X-ray operation.

As another alternative embodiment the sheet of magnetic material may be replaced by a pair of "slugs" inserted into suitable openings within the plastic body of the identifying tag which may be magnetically attracted by the band provided on the cassette frame to maintain the identifying tag in position during an X-ray operation.

It is, therefore, one object of the present invention to provide a novel identifying tag for use with X-ray equipment, and the like, which is comprised of permanently sealed lead letters substantially safe from any breakage or damage wherein the tag assembly is magnetized to greatly facilitate its removal and replacement from a readily accessible tag mounting board.

Another object of the present invention is to provide a novel identifying tag for use with X-ray equipment, and the like, which is comprised of permanently sealed lead letters substantially safe from any breakage or damage wherein the tag assembly is magnetized to greatly facilitate its removal and replacement from readily accessible tag mounting board, and further comprising a cover sheet for sealing the lead letters in which the word identifying the tag is formed in strong contrast to the cover sheet background to make the identifying tags simple and easy to read even from substantial distances.

Another object of the present invention is to provide a novel identifying tag for use with X-ray equipment, and the like, which is comprised of permanently sealed lead letters substantially safe from any breakage or damage, wherein the tag assembly is magnetized to greatly facilitate its removal and replacement from a readily accessible tag mounting board, and further comprising a cassette adapted for holding the identifying tag in position during an X-ray operation which is provided with a magnetically attractive metallic band for positioning and releasably securing the identifying tag during the X-ray operation.

Another object of the present invention is to provide a novel identifying tag for use in X-ray equipment, and the like, comprised of permanently sealed lead letters substantially safe from any breakage or damage wherein the tag is magnetized to greatly facilitate its removal and replacement from a readily accessible tag mounting board and further comprising an insulating non-magnetic member provided on at least one face thereof forming a shoulder with the resilient magnetic member to facilitate mounting of the identifying tag upon an X-ray cassette wherein the exposed marginal portion of the magnetic member adheres to the magnetically attractive metallic frame of the cassette for releasable securement during the X-ray operation.

These and other objects of the present invention will become apparent when reading the accompanying description and drawings in which:

FIG. 1 is a perspective view of a magnetic plastic sheet utilized in the present invention.

FIG. *1a* shows a sectional view of the sheet of FIG. 1 looking in a direction of arrows 1*a* and 1*a'*

FIG. 2 is a perspective view showing a cover sheet employed in the identifying tag of the present invention.

FIG. *2a* is a sectional view of the members shown in FIG. 2 taken along the lines 2*a*–2*a'*.

FIG. 3 is a perspective view showing a completed assembly comprised of the elements of FIGS. 1 and 2 wherein only a portion of the completed assembly is shown for purposes of simplicity.

FIG. 3*a* is a sectional view of the embodiment of FIG. 3 looking in the direction of arrows 3*a*–3*a'*

Figure 7B:
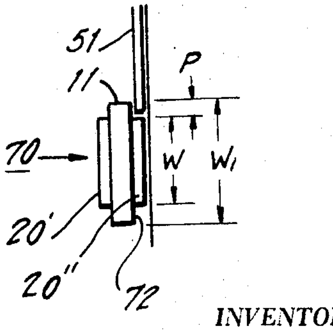
Figure 7A:
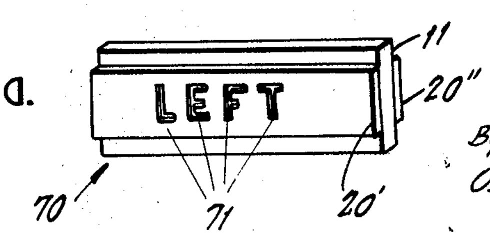

FIGS. 7*a* and 7*b* are perspective and end views respectively of still another preferred embodiment of the present invention.

Figure 1:
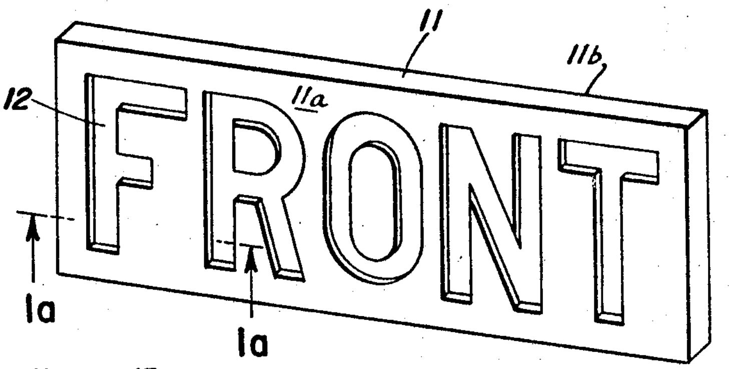

Referring now to the drawings, FIG. 1 shows one portion 10 of an identifying tag designed in accordance with the principles of the present invention. The assembly 10 is comprised of a relatively thin sheet of plastic material 11 which is substantially cut into rectangular shape, but which may be any other shape, if desired. The plastic material is admixed with a fine magnetic powder so as to provide a homogeneous mixture in which the magnetic powder is uniformly distributed through the entire rectangular sheet 11. Such material is available from a variety of sources, one suitable material being sold under the name "Magnetix."

Depressions such as the depression 12 are formed in one face of sheet 11 so as to form a word or, for example, an abbreviated word, across the face of the sheet. The depth of each depression forming each letter is substantially of uniform thickness.

Figure 1A:
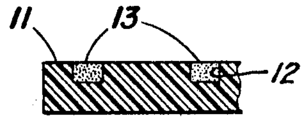

Once the particular word which the identifying tag is to represent has been machined or otherwise cut into face 11*a*, a pasty substance comprised of a fine lead powder (also referred to as pulverized lead) admixed with water is deposited into the depression 12, for example, as shown in FIG. 1*a*. The pasty substance is preferably pressed firmly into each depression so as to be of a uniform thickness throughout each depression. The technique of mixing the finely powdered lead with water to form a relatively thick paste greatly facilitates the handling of the lead and the insertion of the pasty substance into the depressions.

After each depression is so filled, the surface 11*a* surrounding the depressions may be wiped clean and allowed to dry. Once the surface is dry, the remaining particles may be easily and quickly removed from surface 11*a* so as to confine the presence of the fine lead powder to the depression.

Figure 2:
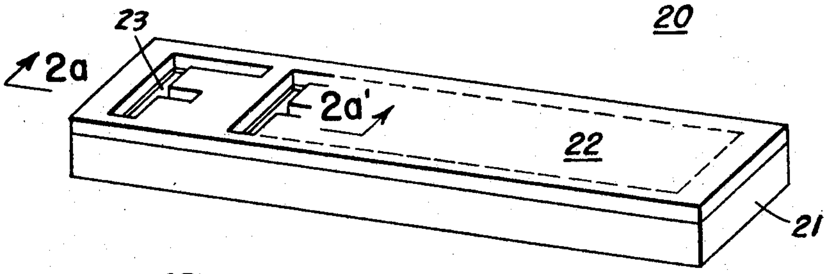
Figure 2A:
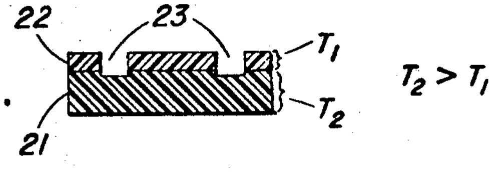

Once the above steps are completed, a cover assembly of the type shown in FIGS. 2 and 2*a* may be secured to the top surface of sheet 11. The subassembly 20 of FIG. 2 is comprised of a pair of thin plastic sheets 21 and 22, preferably laminated to one another and being of contrasting colors. For example, sheet 21 may be a white plastic while sheet 22 may be dark-colored plastic such as black, blue, red and so forth. Obviously, the contrasting colors may be reversed, if desired. The same word formed in the front face 11*a* of subassembly 10 is machined, etched, or otherwise formed in the surface of sheet 22 forming depressions 23. As can be seen in FIG. 2*a*, the depression has a depth D which is greater than the thickness $T_1$ of top sheet 22 to insure the fact that the plastic sheet 21 will be exposed in the region of each depression. The sharply contrasting colors of the plastic sheets 21 and 22 make it quite easy to read the word formed in the subassembly 20 even from great distances. Although not shown in detail in FIG. 2, the remaining depressions of each letter are formed in a similar manner.

Figure 3A:
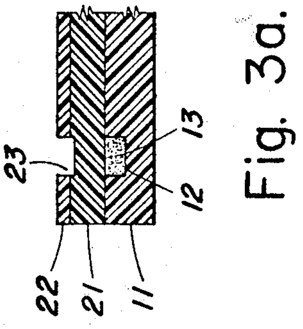
Figure 3:
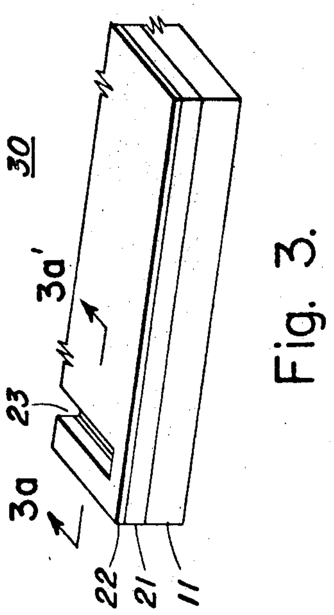

Having formed the subassemblies 10 and 20 of FIGS. 1 and 2, respectively, the final identification tag assembly 30 of FIG. 3 is formed by laminating assembly 20 upon the surface 11*a* of subassembly 10. The assemblies may be joined by a suitable adhesive or glue or may be heat sealed to one another. The subassembly 20 completely seals the pulverized lead material within each depression 12, as can clearly be seen from the sectional view of FIG. 3*a* so that the pulverized lead cannot be removed from the depressions, even assuming that the assembly is accidentally bent or dropped. The plastic materials have a sufficient resiliency to withstand rough handling.

Figure 4:
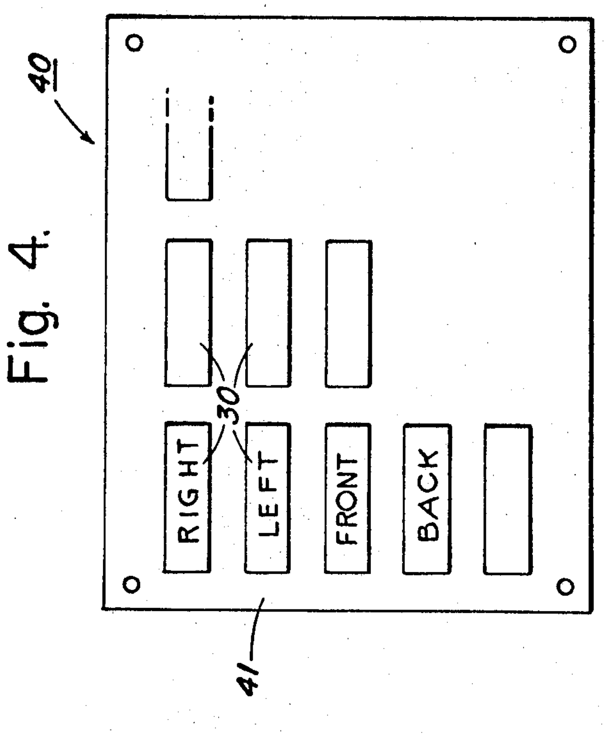
FIG. 4 shows a plan view of a mounting board for mounting identifying tags of the type shown in FIGS. 1 through 3*a*.

FIG. 4 shows the manner in which a multiplicity of such identifying tags may be conveniently assembled within an X-ray room. The arrangement 40 of FIG. 4 is comprised of a metallic board 41 mounted upon one wall, or other support, of the X-ray room. Each individual identifying tag is simply "slapped" or placed against the board, preferably with the rear face 11*b* of sheet 11 making contact with the surface of board 41. Although the magnetization of each identifying tag 30 is of sufficient strength to allow each tag to be mounted upon the board and to cling to the board with the face of sheet 22 engaging the face of board 41, it is preferable that the former manner of mounting described above be employed since it is easier to determine which identifying tag is to be selected by exposing the words formed in the face of sheet 22. In use, the X-ray technician simply glances at the tags 30 on board 41, selecting that tag which he desires to use at any given instant. The tag is then positioned upon an X-ray film cassette 50, shown in FIG. 5, in a position where it will be exposed to the X-rays. The word formed by the depressions 12 of FIG. 1 is substantially in alignment with the word formed in the face of sheet 22 of FIG. 2 so as to facilitate correct positioning upon the cassette 50 (i.e., so that the word will not appear in its reverse or mirror image fashion). The X-rays are incapable of penetrating the pulverized lead deposited within depressions 12, causing the word "RIGHT" (for example) to be formed in the X-ray film strip when developed.

Figure 5:
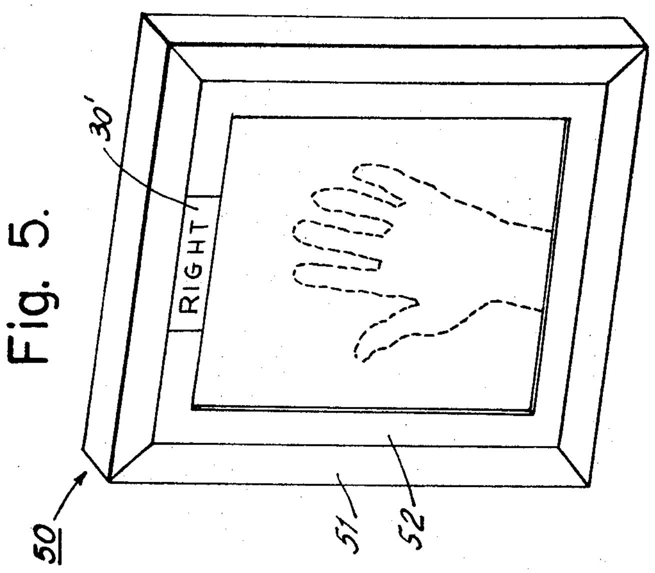
FIG. 5 is a perspective view showing the manner in which an identifying tag of the present invention may be employed.

In some applications, the cassette is simply placed upon a supporting surface, and the particular portion of the subject to be X-rayed is positioned above the cassette, for example, in the manner shown in FIG. 5. In other applications, a lead Bucky is positioned a spaced distance beneath the supporting surface, and the cassette is then slid into position within the confining space. In such applications, it is necessary that the identifying tag be quite thin in order that the tag not be pushed off the cassette as it is positioned between the supporting surface and the Bucky. The assembly of the present invention is quite thin, usually of the order of ⅛ inch, and is thereby capable of remaining positioned upon the cassette, for example, in the manner shown in FIG. 5, without any danger of being knocked out of position or off of the cassete when positioned between the supporting surface and the bucking plate.

As another alternative embodiment, the subassembly 20 of FIG. 2 may be replaced by a relatively thin metallic plate which is adhered to the front surface 11*a* of subassembly 10 in the same manner as was previously described. The word formed by the depressions 12 in front face 11*a* is machined, etched, or otherwise formed in the exposed front surface of the metallic plate so as to provide quick, simple means for identifying the word which the tag represents. The metallic sheet provides greater stiffness or rigidity to the structure to reduce the amount of bending which the tag assembly may undergo. The use of a metallic plate does not add to the overall thickness of the assembly, allowing the use of the tag in all applications and environments in which the previously described embodiment may be employed.

The surface of the metal plate may have a finish which provides a good contrast to the natural color of the metal sheet to facilitate reading of the word etched therein.

Figure 6:
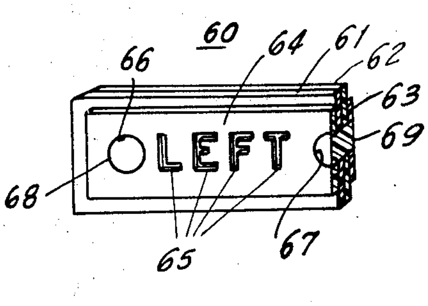
FIG. 6 is a perspective view showing an alternative embodiment of the present invention wherein a portion thereof has been broken away to show the manner of assembly.

FIG. 6 shows another preferred embodiment 60 of the present invention in which the sheet of magnetic plastic material is replaced by a pair of "slugs." The embodiment 60 is comprised of a pair of plastic sheets 61 and 62 of substantially rectangular shape. The surface of sheet 62 facing in the outward direction relative to the plane of FIG. 6 is etched in the manner shown in FIG. 1 to form the letters "LEFT" for receipt for the pulverized lead material previously described, which may be inserted into the cavities in the manner described with respect to FIGS. 1 and 1*a*. Upon completion of this step the sheet 61 is adhered to the face of sheet 62 by suitable adhesive means or through a heat sealing operation to assure complete containment of the pulverized lead material within the cavities provided in sheet 62. A pair of plastic sheets 63 and 64 are then secured to the rear face of sheet 62 and front face of sheet 64 respectively. Sheet 64 (and sheet 63, if desired) is preferably a laminated array of the type shown in FIGS. 2 and 2*a*—the outer sheet of which may be etched in the manner shown in these figures to form the same letters 65 in sheet 64 as have been formed in the cavities provided in sheet 62 which receive the pulverized lead material. Preferably the two sheets forming sheet assembly 64 are of contrasting colors to facilitate visual observance thereof in the same manner as was previously described.

A pair of openings 66 and 67 are then punched, drilled or otherwise formed in the assembled unit. Slugs 68 and 69 are inserted within the openings. The outer curved surfaces of the "slugs" may be provided with an adhesive for firmly adhering the slugs to the interior surfaces of the openings. The slugs 68 and 69 may be formed of the same magnetic plastic material referred to above or, if desired, may be formed of metallic permanent magnet material. This assembly may be utilized in the same manner as was previously described with regard to the assembly 30 shown in FIG. 4, for example, insofar as mounting the identifying tags to the board 41 are concerned. Insofar as the mounting of the embodiment 60 or the embodiment 30 to cassettes are concerned, the conventional method has been comprised of the use of a strip of adhesive for securing the identifying tag to the cassette. In order to fully utilize the magnetic properties of the identifying tag, the conventional cassette 50, shown in FIG. 5, may be modified by providing a thin metallic border assembly 52 positioned immediately adjacent the interior edge of the cassette frame 51. The metallic frame 52 is preferably formed of a thin sheet of magnetically attractive metal which may, for example, be of the order of ½″ in width. If desired, four such sheets may be provided to form the border frame. Another alternative which may be employed is the use of a single sheet covering the entire face of the cassette whose dimensions are defined by the interior sides of the steel frame 51 of the cassette. Coverage of the entire surface of the cassette by a thin metallic sheet in no way affects penetration of the sheet by the X-rays and hence in no way affects the production of the X-ray negative by the radiation. Any of the assemblies 30 or 60 may be mounted upon the cassette by positioning the identifying tag upon the surface of the magnetically attractive frame assembly 52 in the manner shown by the identifying tag 30′ of FIG. 5. The magnetic properties of the identifying tag 30′ cause it to remain in position upon the frame 52 during the X-ray operation. Although the frame 52 is formed of a metallic material, this material is nevertheless capable of passing X-rays to enable the word RIGHT to be formed upon the X-ray negative in the same manner as was previously described. After completion of the X-ray operation, the identifying tag 30′ may be easily and quickly removed, simply by lifting it away from the frame 52. The magnetically attractive frame may be applied to the cassette by means of a suitable adhesive or any other mechanical or fastening arrangement.

FIGS. 7*a* and 7*b* show still another preferred embodiment 70 of the present invention in which advantage may be taken of the magnetic properties of the identifying tag for adhering to the cassette without the need for the magnetically attractive metal band described above.

The assembly 70 is comprised of a resilient magnetic member 11 substantially identical to the member 11 described with respect to FIGS. 1 and 1*a*. The magnetic member 11 is prepared in the same manner as was previously described wherein recesses are formed in the front face thereof in the configuration of the letters LEFT, and these recesses are filled with the pulverized lead. A pair of face plate assemblies 20′ and 20″ are secured to opposite faces of the resilient magnetic member in the same manner as was previously described. Face plate 20′ covers the recesses provided in member 11 so as to permanently seal the pulverized lead within the recesses provided in member 11. The assemblies 20′ and 20″ may each be comprised of two laminated sheets of plastic material of contrasting colors. The top sheet is cut in the manner described previously with respect to FIGS. 2 and 2*a* to form the letters 71 in the face of assembly 20′ which spell out the word LEFT. The rear assembly 20″ may be cut or otherwise machined in a similar manner so that the word LEFT appears on both surfaces thereof, if desired. As an alternative, the assembly 20″ may be replaced with a single plastic sheet, if desired, since the necessity for forming the word LEFT is not necessary. The width W of the front and rear plastic sheets 20′ and 20″ is less than the width $W_1$ of the resilient magnetic member 11 (as shown best in FIG. 7*b*) fully exposing a marginal portion along the top and bottom of the resilient magnetic member along both front and rear surfaces thereof. This arrangement is provided for the following reason:

The conventional frame 51 of the cassette 50, shown in FIGS. 5 and 7*b*, is typically formed of a magnetically attractive metal. In order to position the identifying tag upon the cassette and to take advantage of the magnetic properties of the identifying tag, the thickness of the rear plastic sheet 20″ is of the order of the thickness of the frame 51 thereby allowing the marginal portion of the magnetic member to overlie one side of the cassette frame 51. This enables the identifying tag to remain in position during the X-ray operation with the "lead letters" overlying the X-ray negative. The identifying tag may simply be removed from the cassette after completion of the X-ray operation by lifting the tag away from the cassette and replacing it upon the board 41 shown in FIG. 4. The magnetic attractiveness of the resilient magnetic member 11 is sufficient to cause the identifying tag to cling to board 41 in spite of the fact that an insulating plastic sheet 20′ is provided on the rear surface of the magnetic member 11.

As an alternative arrangement to that shown in FIGS. 7 and 7*a*, the face plate assemblies 20′ and 20″ may be formed of thin sheets of magnetic material, while member 11 may be a thicker plastic material having no magnetic properties. The recesses provided therein may be the same as described above for purposes of positioning the identifying tag upon the cassette. The visually observable letters may be formed in either one or both of the thin magnetic sheets 20′ or 20″. It is possible to cut through the depth of the thin magnetic sheet (20′ or 20″) to cause the plastic sheet to be observed. If this is done, it is obvious that the plastic sheet which will now carry the depressions for receiving the pulverized lead material should be completely covered by the thin magnetic member not carrying the visually observable letters. As an alternative arrangement, a thin cover sheet may be placed over the plastic sheet 11, enabling the visually observable letters to be cut completely through the thin magnetic sheet while retaining complete concealment and containment of the pulverized lead deposited in the grooves of the thick plastic sheet 11. The other alternative embodiments described hereinabove may likewise be made reversible, i.e. the plastic sheets may be non-magnetic and the magnetic sheets may be made of plastic.

In certain instances it is desirable to place the identifying tag upon the cassette with the word LEFT bearing directly against the surface of the cassette. This is made possible by the embodiment 70 of FIG. 7*a* wherein a similar marginal portion of the magnetic member 11 is exposed to allow it to be magnetically attracted to a portion of the frame 51 in the same manner as the rear surface portion overlies the frame as shown in FIG. 7*b*. The arrangement of FIG. 7*a* thereby allows the identifying tag to be positioned upon the cassette in either faceup or face-down fashion. As an alternative arrangement to the assembly 70 of FIGS. *7a* and *7b* the plastic sheet 20'' may be replaced simply by notching the magnetic resilient member 11 by machine operation, for example, to provide the recessed marginal portions of 72 as shown in FIG. *7b*, which will serve the same purpose as providing a plastic sheet 20'' upon the rear surface of magnetic member 11.

It can be seen from the foregoing that the present invention provides a novel identifying tag for use with X-ray equipment, and the like, wherein the tags are formed of a durable plastic material having magnetic properties to facilitate mounting of the tags upon a mounting board positioned in a readily accessible location within the X-ray room to greatly facilitate removal and replacement of tags by technicians, thereby greatly simplifying the activities of a technician in producing X-rays. Further advantage may be taken of the magnetic properties provided in the identifying tag assembly by forming the identifying tag assembly to have a portion of its magnetic member overlie the magnetically attractive frame of a cassette. As an alternative embodiment, a thin metallic, magnetically attractive frame may be provided upon the cassette positioned just inside the conventional frame of the cassette to allow the identifying tag to be releasably secured to the cassette during an X-ray operation to avoid the tedious conventional technique of applying the identifying tag to the cassette by means of an adhesive strip.

Although this invention has been described with respect to its preferred embodiments, it will be understood that many variations and modifications will now be obvious to those skilled in the art, and it is preferred, therefore, that the scope of the invention be limited not by the specific disclosure herein, but only by the appended claims.

What is claimed is:

1. An identifying tag for magnetically attractive use with cassettes employed in producing radiographs, said tag comprising:

a first thin plastic sheet having depressions formed in one face, said depressions cooperating to form a word;

a powdered material comprised of pulverized lead being uniformly deposited within said depressions;

a thin cover sheet laminated to the said one face to completely seal said depressions;

a word being formed in the exposed face of said cover sheet, the word formed in said cover sheet being the same as the word formed in said plastic sheet;

said plastic sheet being further comprised of a plastic material substantially homogeneously admixed with particles of a magnetized material enabling said tag to be magnetically attracted to a metallic mounting surface on said cassette to facilitate removal and replacement of said tag from the mounting surface.

2. The tag of claim 1, wherein said cover sheet is formed from a thin metallic sheet having said word etched in one surface thereof.

3. The tag of claim 1, wherein said cover sheet is comprised of second and third thin plastic sheets of contrasting colors being laminated to one another;

the word formed in said cover sheet being comprised of depressions formed in the exposed surface of one of said second and third thin plastic sheets; the depth of each depression being slightly greater than the thickness of the thin plastic sheet having its surface exposed and being less than the total thickness of said second and third thin plastic sheets to expose portions of the thin plastic sheet adjacent said first plastic sheet.

4. An identifying tag set useful in producing X-rays comprising a metallic mounting board formed of a magnetically attractive metal;

a plurality of tags each being of the type described in claim 1; the words formed in each tag being different;

the plastic sheet of each tag being further comprised of a plastic material substantially homogeneously admixed with particles of a magnetized material capable of being attracted to said mounting board to facilitate removal and replacement of each of said tags upon said mounting board.

5. The identifying tag of claim 1, wherein the first plastic sheet and thin cover sheet are each provided with aligned openings;

a magnetic member being positioned within said aligned openings, which openings are positioned beyond the word formed in the exposed face of said cover sheet.

6. The identifying tag of claim 1, further comprising a second thin plastic sheet secured to the rear face of said first plastic sheet having a width substantially less than the width of said first plastic sheet to expose marginal portions of said first plastic sheet along its upper and lower edges for securement to the magnetically attractive frame of a cassette.

7. An X-ray cassette for use with the identifying tag of claim 1, said cassette being comprised of means for receiving an X-ray negative to be exposed during an X-ray operation, said means being surrounded by a cassette frame;

a thin magnetically attractive metallic strip being positioned just inside said cassette frame and overlying a portion of said negative for releasably receiving an identifying tag which is magnetically attracted to said thin metallic frame.

8. The identifying tag of claim 1, wherein the rear surface of said first thin plastic sheet is notched along at least one of its marginal edges to provide a recessed portion therealong to facilitate the mounting to the magnetically attractive frame of an X-ray cassette.

9. A method of producing tags useful in making X-ray negatives and being magnetically attractive with X-ray cassettes, comprising the steps of:

providing a plastic sheet;

forming depressions in said plastic sheet to represent a word;

admixing pulverized lead with water to form a paste;

uniformly spreading said paste across the face of said plastic sheet to fill said depressions;

wiping the face of said sheet to remove excess paste from the face of said plastic sheet;

providing a cover sheet;

forming the same word in one face of said cover sheet as is formed in said plastic sheet;

laminating the opposite face of said cover sheet to the face of said plastic sheet containing said depressions;

said plastic sheet being formed of a plastic material substantially homogeneously admixed with particles of a magnetized material to render said plastic sheet attractive to a metallic surface capable of being magnetically attracted.

10. An identifying tag for use in producing radiographs, said tag comprising:

a first thin plastic sheet having depressions formed on one face, said depressions cooperating to form a word;

a powdered material comprised of pulverized lead being uniformly deposited within said depressions;

a thin cover sheet laminated to the said one face to completely seal said depressions;

a word being formed in one of the exposed faces of said tag, the word formed in said one exposed face being the same as the word formed in said plastic sheet;

an X-ray cassette comprised of means for receiving an X-ray negative to be exposed to the rays during an X-ray operation, said means being surrounded by a cassette frame;

a strip being affixed to one exposed face of said cassette adjacent said frame and overlying a portion of said negative for releasably receiving an identifying tag at least one of said strip and said tag is magnetized, while the remaining one of said strip and said tag includes a magnetically attractive material, whereby said strip and said tag are magnetically attracted to one another.

References Cited

UNITED STATES PATENTS

| | | | |
|---|---|---|---|
| 966,696 | 8/1910 | Merrill | 250—67 |
| 1,447,430 | 3/1923 | Richardson | 250—63 |
| 1,735,883 | 11/1929 | Smith | 40—142 |
| 2,018,175 | 10/1935 | Knight | 250—67 |
| 2,120,064 | 6/1938 | Buckley | 250—67 |
| 3,407,507 | 10/1968 | Brubaker | 335—303 X |

WILLIAM F. LINDQUIST, Primary Examiner

U.S. Cl. X.R.

40—142; 250—68; 335—303